United States Patent
Derrien

(10) Patent No.: US 10,661,922 B2
(45) Date of Patent: May 26, 2020

(54) METHOD FOR FORMING A PACKAGING FROM A CONTAINER, COMPRISING A THERMAL MONITORING PHASE

(71) Applicant: SIDEL PARTICIPATIONS, Octeville-sur-Mer (FR)

(72) Inventor: Mikael Derrien, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 542 days.

(21) Appl. No.: 15/288,296

(22) Filed: Oct. 7, 2016

(65) Prior Publication Data
US 2017/0101201 A1    Apr. 13, 2017

(30) Foreign Application Priority Data
Oct. 8, 2015    (FR) ................................. 15 59570

(51) Int. Cl.
| | |
|---|---|
| B29C 49/06 | (2006.01) |
| B29C 49/42 | (2006.01) |
| B65B 3/02 | (2006.01) |
| B65B 7/28 | (2006.01) |
| B65B 47/04 | (2006.01) |

(Continued)

(52) U.S. Cl.
CPC ............... *B65B 7/28* (2013.01); *B65B 3/022* (2013.01); *B65B 47/04* (2013.01); *B65B 57/18* (2013.01); *B65B 63/08* (2013.01); *B67C 3/007* (2013.01); *B29C 49/06* (2013.01); *B29C 49/4273* (2013.01); *B67C 2003/226* (2013.01)

(58) Field of Classification Search
CPC ......... B65B 61/24; B65B 63/08; B67C 3/007; B67C 2003/226

USPC ................... 53/52, 507, 440, 127, 471, 281
See application file for complete search history.

(56) References Cited

U.S. PATENT DOCUMENTS

| | | | | |
|---|---|---|---|---|
| 5,031,298 A | * | 7/1991 | Fresnel | ................. B65B 53/063 29/447 |
| 5,398,734 A | * | 3/1995 | Hartel | .................... B08B 9/205 141/78 |

(Continued)

FOREIGN PATENT DOCUMENTS

JP    H0542992    2/1993

OTHER PUBLICATIONS

French Search Report dated Jun. 24, 2016; Application No. FR 1559570.

*Primary Examiner* — Robert F Long
*Assistant Examiner* — Patrick B Fry

(57) ABSTRACT

Method for forming a packaging (2) from a container (1) that has a body (5), a neck (8), and a bottom (6), the container (1) having a deformable zone (15) with an extended configuration in which the zone (15) projects toward the outside of the container (1), with a retracted configuration in which the zone (15) projects toward the inside of the container (1), with this method including the following operations:
  filling the container (1) with a hot product;
  closing in an airtight manner the thus filled container (1);
  measuring the temperature of the stoppered container (1);
  comparing the measured temperature to a preset threshold value;
  if the measured temperature is less than or equal to the threshold value, moving the deformable zone (15) back toward its retracted position.

20 Claims, 5 Drawing Sheets

(51) Int. Cl.
    *B65B 57/18*     (2006.01)
    *B65B 63/08*     (2006.01)
    *B67C 3/22*     (2006.01)
    *B67C 3/00*     (2006.01)

(56) References Cited

U.S. PATENT DOCUMENTS

| | | | |
|---|---|---|---|
| 7,926,243 B2 * | 4/2011 | Kelley | B65B 61/24 |
| | | | 53/440 |
| 8,381,940 B2 * | 2/2013 | Melrose | B65B 7/2835 |
| | | | 220/609 |
| 8,671,653 B2 | 3/2014 | Kelley et al. | |
| 8,968,645 B2 * | 3/2015 | Euler | A61L 2/22 |
| | | | 422/3 |
| 8,994,556 B2 * | 3/2015 | Lundy | G08C 17/02 |
| | | | 340/870.16 |
| 9,718,567 B2 * | 8/2017 | Clusserath | B29C 49/46 |
| 9,828,130 B2 * | 11/2017 | Florian | B65C 3/16 |
| 2004/0131519 A1 * | 7/2004 | Amedeo | A23L 3/01 |
| | | | 422/308 |
| 2008/0308386 A1 * | 12/2008 | Balk | B65G 17/005 |
| | | | 198/347.1 |
| 2012/0085071 A1 | 4/2012 | Hahn et al. | |
| 2014/0298100 A1 * | 10/2014 | Grimm | B29C 49/78 |
| | | | 714/37 |
| 2016/0152457 A1 * | 6/2016 | Godet | B67C 3/007 |
| | | | 53/440 |
| 2017/0348893 A1 * | 12/2017 | Ueda | A61L 2/20 |

* cited by examiner

METHOD FOR FORMING A PACKAGING FROM A CONTAINER, COMPRISING A THERMAL MONITORING PHASE

FIELD OF THE INVENTION

The invention relates to the field of the production of packaging from containers made of a plastic material, which are filled with hot contents (liquids, pastes), i.e., the contents are at a temperature that exceeds the glass transition temperature of the material in which the container is manufactured.

BACKGROUND OF THE INVENTION

Hot filling is common for certain special contents, in particular those undergoing pasteurization (fruit juice or other fruit beverages, milk, condiments) or an infusion (tea, coffee).

The temperature of this type of contents commonly exceeds 90° C., while the containers in question are ordinarily manufactured from PET (polyethylene terephthalate), whose glass transition temperature is on the order of 80° C.

Hot filling poses a problem of mechanical strength of the container because of its softening due to its exposure to the heat of its contents.

A known technique making it possible to increase the mechanical strength of the container is heat-setting, which consists, at the end of the forming of the container, in keeping it temporarily at a high temperature (for example, by keeping it in contact with the heated wall of its mold) in such a way as to increase the crystallinity of the material by thermal means.

This technique certainly makes it possible to increase the mechanical performance levels of the container during the filling by imparting to it good mechanical strength, but it may nevertheless prove inadequate. Actually, even when heat-set, the container, once stoppered, cannot stand up to the stresses induced by the contraction of the contents accompanying its cooling. The result is often uncontrolled deformations that degrade both the aesthetics of the container and its mechanical strength (in particular when it has to be palletized).

To monitor the deformations induced by the stresses accompanying the contraction of the cooling contents, a first approach consists in equipping the container with deformable panels, cf., for example, the U.S. Pat. No. 5,704,503 (Continental PET). The panels deform under the pressure prevailing in the container. They swell during filling, and then become hollow when the contents cool. The main drawback of this approach is the limit that the presence of the panels imposes on the freedom of shape of the container, to the detriment of its appearance.

A second approach consists in equipping the container with a membrane bottom that can be put back, cf., for example, the U.S. Pat. No. 8,671,653 (Graham Packaging), in which the membrane is put back by means of a mechanical pusher, in such a way as to reduce the internal volume of the container to put the contents back under pressure and thus to acquire rigidity. This second approach is better than the first in terms of structural rigidity of the container and the freedom of shape for the former, but it imposes manufacturing stresses.

Actually, it happens that the membrane is unstable in its returned position and regains its initial position under the pressure prevailing in the container. A valid hypothesis is that the container has not cooled sufficiently, such that the membrane that is put back cannot reach the desired position that ensures its stable locking in position.

Allowing all of the containers to cool freely for a long time would hamper productivity (remember that the usual throughput today is on the order of 50,000 containers per hour).

An alternative approach would be to subject all of the containers to forced cooling (for example, by vaporization), but this approach consumes energy.

SUMMARY OF THE INVENTION

A first objective is to improve the reliability of the production of the packaging starting from hot-filled containers.

A second objective is to better control the operation for turnaround of a deformable zone provided on the container.

A third objective is to limit the energy consumption during the production of packaging.

For this purpose, a method for forming a packaging starting from a container that has a body, a neck, and a bottom is proposed, with the container having a deformable zone, using a mechanical pusher that can move between a retracted position and a deployed position, from an extended configuration in which said zone projects toward the outside of the container to a retracted configuration in which said zone projects toward the inside of the container, with this method comprising the following operations:

With the deformable zone being in its extended position, filling the container by means of a product that is at a temperature that exceeds the glass transition temperature of the material of the container;

Closing in an airtight manner the thus filled container, by means of a cap mounted on the neck;

Measuring the temperature of the stoppered container;

Comparing the thus measured temperature to a preset threshold value;

If the measured temperature is less than or equal to the threshold value, moving the pusher, starting from its retracted position, toward its deployed position to switch the deformable zone from its extended configuration to its retracted configuration;

If the measured temperature exceeds the threshold value, keeping the pusher at least temporarily in its retracted position.

Various additional characteristics can be provided, by themselves or in combination:

If the measured temperature exceeds the threshold value, an operation is provided that consists in generating a warning signal;

If the measured temperature exceeds the threshold value, an operation is provided that consists in keeping the pusher in its retracted position for a preset time delay, and then an operation that consists in moving the pusher toward its deployed position.

If the measured temperature exceeds the threshold value, an operation for forced cooling of the container is provided, or an operation for shifting the container toward a buffer stock;

An operation for comparison of the temperature measured at a target value that is lower than the threshold value is provided;

If the measured temperature is between the threshold value and the target value, an operation for increasing the force applied by the pusher to the deformable zone and/or an operation for increasing the speed of motion of the pusher is provided;

If the measured temperature is lower than the target value, an operation for reducing the force applied by the pusher to the deformable zone and/or an operation for reducing the speed of motion of the pusher is provided;

The target temperature is approximately 30° C.;

The threshold value is approximately 40° C.;

The deformable zone is a membrane that connects a seat on the bottom and a central pin on the bottom;

The temperature is measured by means of a sensor that consists of a thermal camera or a pyrometer;

The temperature is measured on the body of the container.

BRIEF DESCRIPTION OF THE DRAWINGS

Other objects and advantages of the invention will become evident from the description of an embodiment, given below with reference to the accompanying drawings in which.

DETAILED DESCRIPTION OF THE INVENTION

Figure 1:
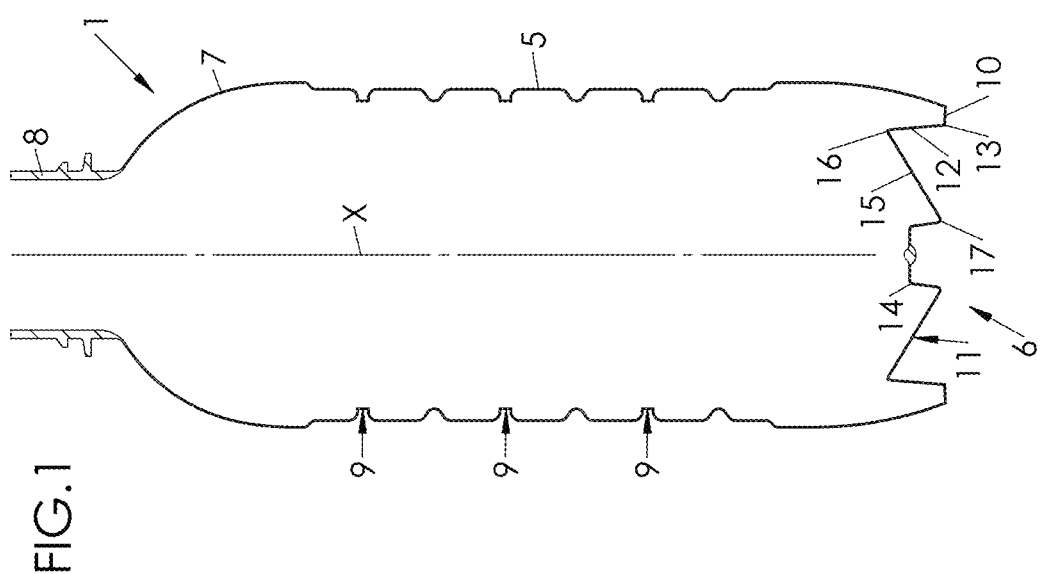
FIG. 1 is a cutaway view showing a container only just formed, with this container being equipped with a bottom in which the deformable zone is a membrane that can be moved back.

FIG. 1 shows a container 1 made of a plastic material (for example, PET) from which is formed a packaging 2, which comprises, in addition to this container 1, contents 3 that are poured into the former, a cap 4 that seals the container 1 in an airtight manner, and, if necessary, an affixed label on which various information intended for the consumer is printed.

The container 1 comprises a body 5 with an essentially cylindrical shape that extends along a main axis X, a bottom 6 that closes the body 5 at a lower end of the former, a shoulder 7 that forms a constriction starting from a lower end of the body 5 opposite to the bottom 6, and an open neck 8 that extends the shoulder 7 and by which the container 1 is filled, and then emptied.

According to an embodiment illustrated in the figures, the body 5 comprises annular strengthening ribs 9 that increase its mechanical rigidity, in particular for preventing its ovalization, i.e., its radial flattening (perpendicular to the axis X), following negative pressure in the container 1 accompanying, for example, the cooling of the contents 3.

The bottom 6 of the container 1 has a peripheral annular seat 10 by which the container 1 is designed to rest on a flat surface such as a table, and an arch 11 that extends the seat 10 toward the axis X and extends projecting toward the inside of the former.

The arch 11 comprises a tapered lateral wall 12 that extends projecting from an inner edge 13 of the seat 10 toward the inside of the container 1, a central pin 14 that projects toward the inside of the container 1, and a deformable zone, consisting of a tapered membrane 15, which can be put back and which extends sloped from an upper edge 16 of the lateral wall 12 to a peripheral edge 17 of the central pin 14.

The container 1 is typically formed by blow molding or stretch blow molding from a previously heated preform, within a mold bearing the impression of the container 1 (apart from the neck 8, which has its final shape on the preform). The container 1 is formed with its membrane 15 in an extended configuration in which the membrane 15 projects toward the outside of the membrane 1 (FIG. 1).

At the end of its forming, the container 1 advantageously undergoes a heat-setting that consists in keeping it in contact with the mold whose temperature is regulated at a relatively high value (greater than approximately 120° C.). This heat-setting increases the crystallinity of the material by thermal means, which increases the mechanical strength of the container 1, enhancing its resistance when the contents 3 are hot.

Figure 2:
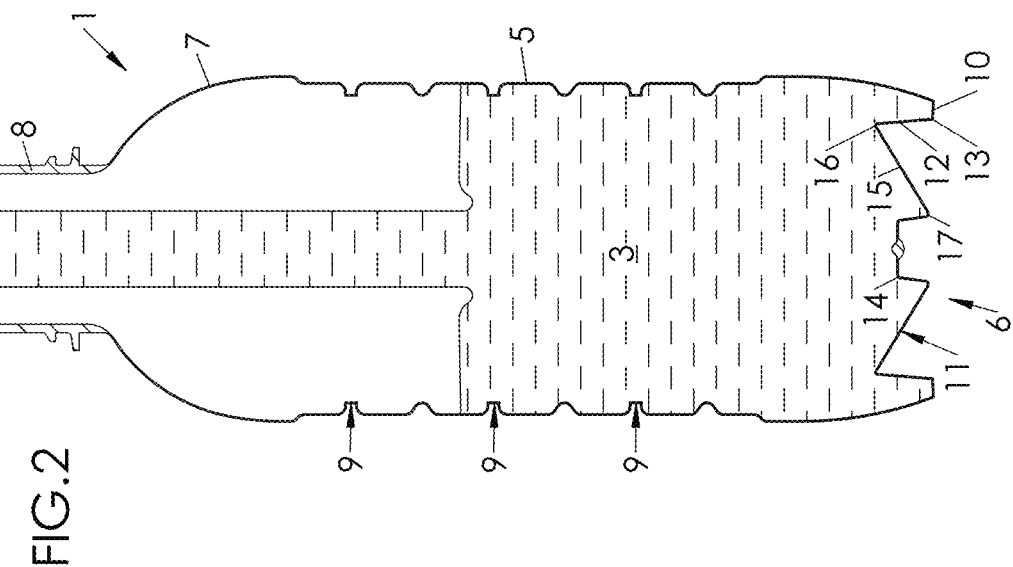
FIG. 2 is a cutaway view of the container of FIG. 1, during filling.

After having been formed, the container 1 undergoes a filling operation that consists in directing via the neck 8 a product (in particular a liquid) that will form the contents 3, as illustrated in FIG. 2. The product can be at a temperature that exceeds the glass transition temperature of the material of the container 1. According to an embodiment, in which the container 1 is made of PET (whose glass transition temperature is on the order of 80° C.), the product poured into the container 1 is at a temperature that is greater than or equal to approximately 90° C.

Thanks to the heat-setting that it has undergone, the container 1 can, without significantly deforming, mechanically stand up to stresses induced by the thermal shock undergone during the filling.

Figure 3:
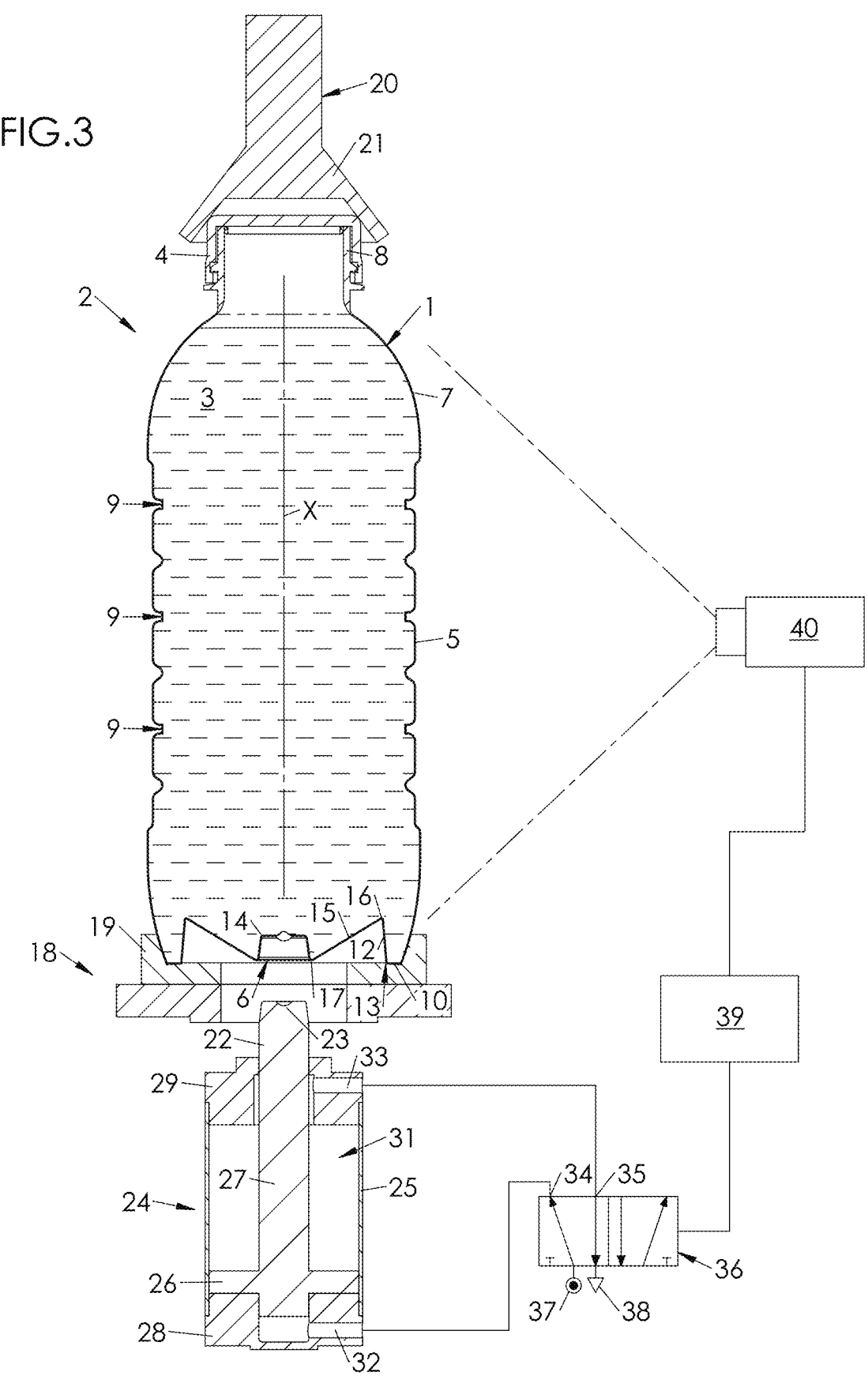
FIG. 3 is a cutaway view of the container of FIG. 2, stoppered and installed on a station equipped with a mechanical pusher arranged for moving the membrane back, opposite which a thermal camera is mounted.

After having been filled, the container 1 is stoppered by means of the cap 4 that is attached and mounted on the neck 8 (by snapping on and/or by screwing), as illustrated in FIG. 3. The container 1 is then sealed in an airtight manner.

After being stoppered, the container 1 is transferred to a reversal station 18 that comprises an annular support 19 in which the container 1 is fitted. More specifically, the support 19 forms a counter-impression at least of the seat 10 and the lower end of the body 5, which locks the container 1 transversely (i.e., perpendicular to the main axis X).

The reversal station 18 also comprises a pulley 20 that locks the container 1 axially (i.e., parallel to the main axis X). In the example illustrated in FIG. 3, the pulley 20 comprises a conical head 21 that comes to rest against the cap 4.

The container 1 is thus held rigidly between the support 19 and the pulley 20.

The reversal station 18 also comprises a mechanical pusher 22 that can move in relation to the support 19 and is able to come into contact with the bottom 6 through the latter for moving the membrane 15 back from its extended position to its retracted position, while the container 1 is held between the support 19 and the pulley 20 without any possibility of axial movement.

More specifically, the pusher 22 can move in translation along the axis X between a retracted position in which it extends at some distance from the bottom 6 of the container 1, and a deployed position in which it projects from the support 19 toward the inside of the container 1. In the illustrated example, the pusher 22 has a free end 23 with a shape that is complementary to that of the pin 14, but this end 23 could have a simpler shape, for example cylindrical.

The reversal station 18 also comprises an actuator 24 that is suitable for moving the pusher 22, on the one hand, from its retracted position to its deployed position for implementing the backward movement (i.e., the turnaround) of the membrane 15, and, on the other hand, conversely, from its deployed position to its retracted position where it is thus ready for the next cycle.

According to an embodiment, the actuator 24 is a jack (electric or, as in the illustrated example, pneumatic or hydraulic).

The actuator 24 comprises a cylindrical body 25, a piston 26, and a rod 27 that is integral with the piston 26. The pusher 22 is attached to the rod 27 or, as in the illustrated example, formed in an individual manner with the former.

The actuator 24 comprises two walls that close the body 25: one rear end wall 28 and one opposite front end wall 29, with the latter being pierced by a hole through which the rod 27 extends. The piston 26 defines, in the body 25, a rear chamber 30, between the piston 26 and the rear end wall 28, and a front chamber 31 around the rod 27, between the piston 26 and the front end wall 29.

The rear chamber 30 and the front chamber 31 are in fluid communication via a rear inlet 32 made in the rear end wall 28 and via a front inlet 33 made in the front end wall 29, respectively with a first outlet 34 and a second outlet 35 of a fluid distributor 36 further connected to a fluid source 37 (for example, air or oil) that is pressurized and has a drain 38. As FIG. 3 shows, the distributor 36 is directed by an automated monitoring unit 39, such as an API (industrial programmable robot).

The rear chamber 30 and the front chamber 31 are alternately put into fluid communication with the fluid source 37 and the drain 38 via the distributor 36, in such a way as to move the pusher 22 (via the piston 26) successively from its retracted position, in which the piston 26 is in the vicinity of the rear end wall 28, to its deployed position, in which the piston 26 is in the vicinity of the front end wall 29.

It has been determined, however, that if the membrane 15 is moved back while the container 1 is too hot, its mechanical strength will not be enough for the membrane 15 to retain its retracted position reliably.

This is why a phase for monitoring the temperature of the container 1 is provided between the stoppering operation and the operation for moving the membrane 15 back, which phase comprises:

An operation for measuring the temperature of the stoppered container 1,
An operation for comparison of the thus measured temperature at a preset threshold value Ts, recorded in the monitoring unit 39.

The temperature measurement is carried out by means of a sensor 40, preferably in the form of a thermal camera that makes it possible to produce a complete thermal profile on the entire body 5 of the container 1. The camera 40 is, for example, the model A315 that is marketed by the FLIR Company, which makes it possible to produce images in the thermal range from −20° C. to 120° C. with a resolution of 320×240 pixels. As illustrated in FIG. 3, the camera 40 is connected to the monitoring unit 39 to which it communicates its measurements. As a variant, the sensor 40 is a pyrometer that takes a point temperature measurement. A pyrometer may be suitable if it is noted that the temperature of the container 1 is homogeneous and can be extrapolated from a temperature measurement at a single point of the container 1.

According to an embodiment, the camera 40 is common to multiple (and, for example, to all) reversal stations 18 by being positioned in a stationary manner facing a wheel on which the stations 18 are mounted. According to another embodiment, each station 18 is equipped with its own thermal camera 40.

As illustrated in FIG. 3, the camera 40 is preferably positioned in such a way that its field of view encompasses the body 5 of the container 1, to be able to line up a complete thermography.

The temperature measurement that is thus carried out is communicated by the camera 40 to the monitoring unit 39. The former compares the recorded temperature to the threshold value Ts, and:

If the measured temperature is less than or equal to the threshold value Ts, the monitoring unit 39 immediately controls the movement of the pusher 22, starting from its retracted position, toward its deployed position for moving the membrane 15 back by switching it from its extended configuration to its retracted configuration;

If the measured temperature exceeds the threshold value Ts, the monitoring unit 39 controls the at least temporary holding of the pusher 22 in its retracted position.

In the first case, the pressure applied in the container 1 on the membrane 15 by the content is considered as low enough to allow the movement of the pusher 22 (and hence to put the membrane 15 back), while the mechanical rigidity of the container 1 (and in particular the bottom 6) is declared to be sufficient for the membrane 15 to be able to be locked in its retracted configuration (after being put back) despite the pressure exerted by the contents 3.

Figure 4:
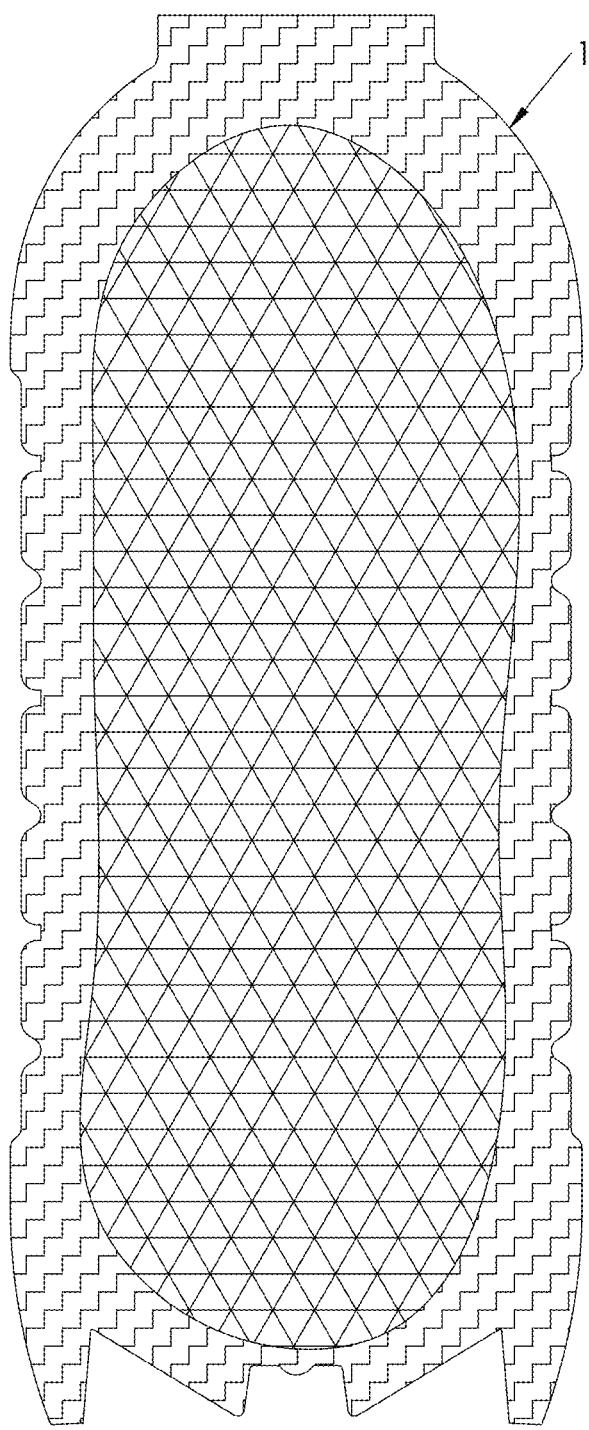
FIG. 4 is a first thermal image of a container, accompanied, for the reading of the image, by a palette of colors corresponding to different temperature ranges.
Figure 4:
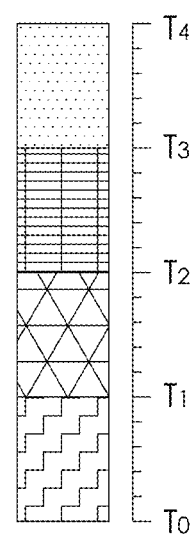

This first case was illustrated in FIG. 4, which shows a thermography of a container 1 carried out after the stoppering, as recorded in the monitoring unit 39 that integrates an imagery program. A legend is, for purely illustrative purposes, shown in FIG. 4 for facilitating the understanding of the operating mode applied by the monitoring unit 39. This legend comprises four ranges of temperatures $[T_i; T_{i+1}]$ (where i is a positive integer or zero, with the temperatures increasing according to the increasing value of the index i) shown by different patterns. Thus:

$[T_0, T_1]$ is shown by a zigzag pattern;
$[T_1, T_2]$ by a triangular pattern;
$[T_2, T_3]$ by a rectangular criss-cross pattern;
$[T_3, T_4]$ by a point pattern.

The values of the temperatures $T_i$ are, for example, the following:

$T_0$=30° C.;
$T_1$=35° C.;
$T_2$=40° C.;
$T_3$=45° C.;
$T_4$=50° C.

It is noted, according to the thermography that is illustrated in FIG. 4, that the corresponding container 1 has two temperature zones: an external zone whose temperature is between $T_0$ and $T_1$ (or between 30° C. and 35° C. in the example above) and a central zone whose temperature is between $T_1$ and $T_2$ (or between 35° C. and 40° C. in the example above). Consequently, assuming that the value 40° C. is assigned to Ts, it is seen that the temperature of the container 1 whose thermography is illustrated in FIG. 4 is lower than Ts.

Consequently, it is decreed that the membrane 15 of this container 1 can be put back. In this case, immediately after the monitoring unit 39 has made this assessment, it controls the movement (via the distributor 36) of the pusher 22 from its retracted position to its deployed position for moving the membrane 15 back toward its retracted configuration, thus putting the container 1 under pressure.

In the second case, by contrast, the residual pressure inside the packaging 2 is either too high to allow the movement of the pusher 22 (and hence to put the membrane 15 back), or, if we suppose that the movement of the pusher is possible, too important to make it possible for the membrane 15 to be locked in its retracted configuration (after being put back). In other words, the membrane 15 runs the risk of being put back unexpectedly, under the pressure prevailing in the container 1, from its retracted configuration (after mechanical reversal) to its extended configuration.

Figure 5:
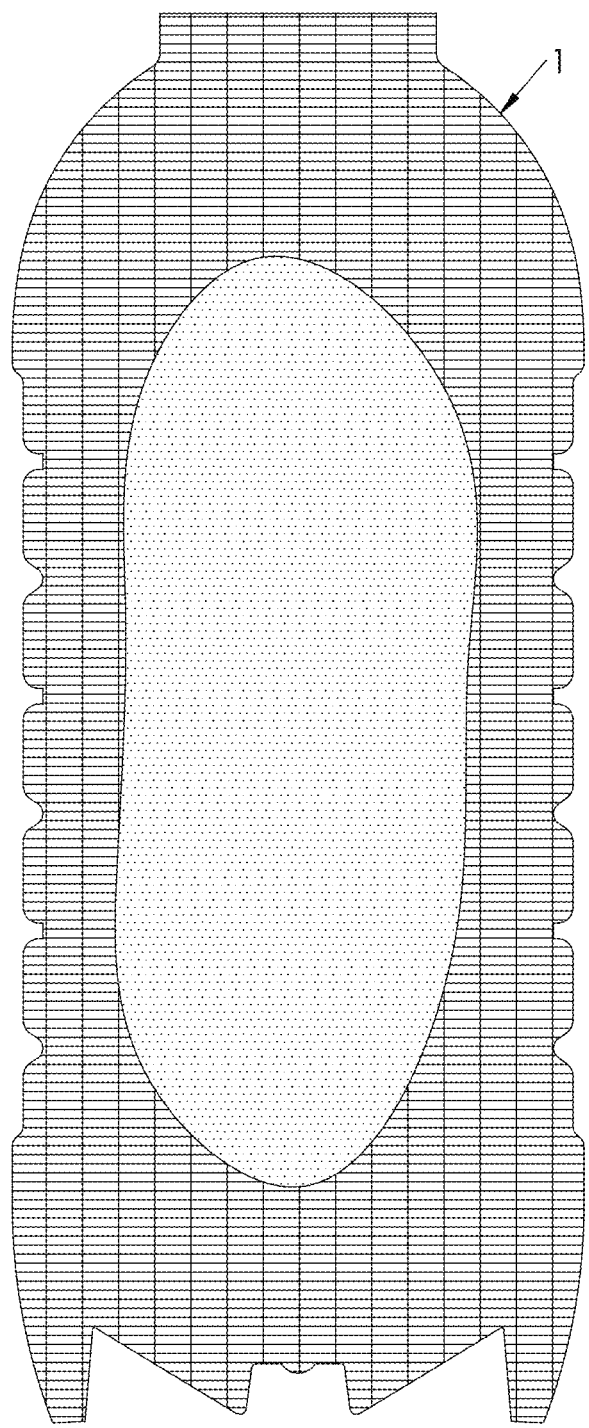
FIG. 5 is a second thermal image of a container.
Figure 5:
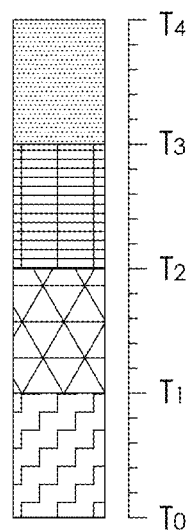
Figure 6:
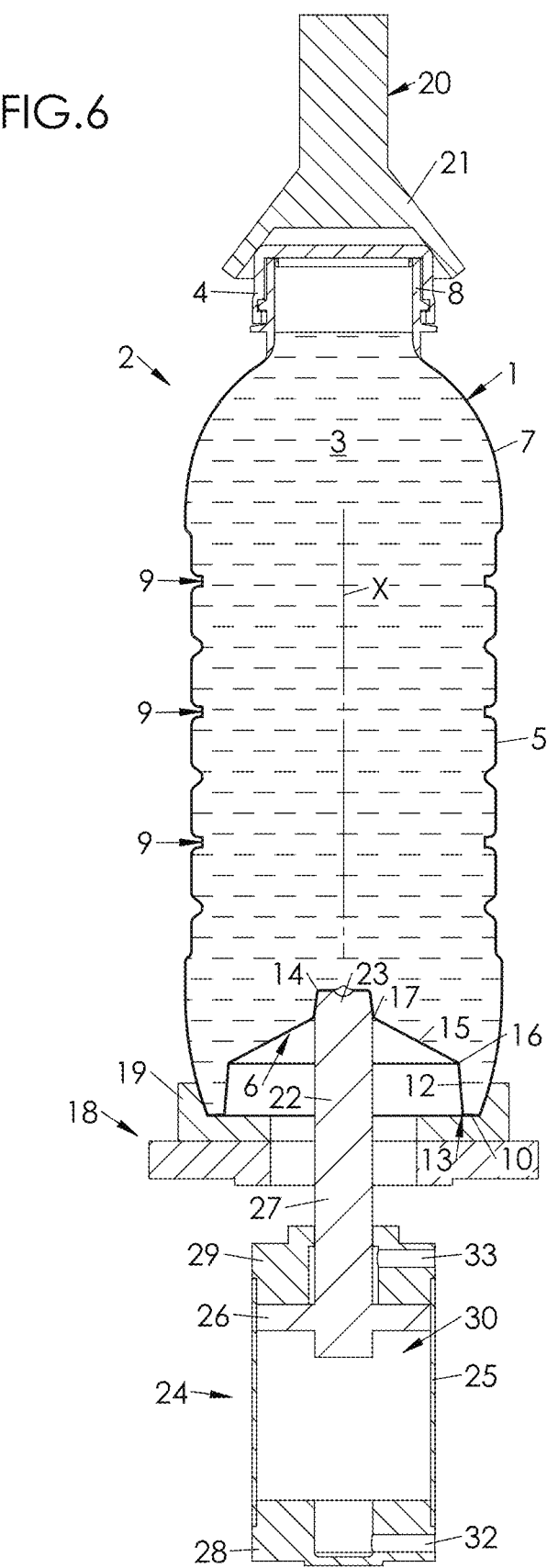
FIG. 6 is a cutaway view that illustrates putting the membrane back.

This second case was illustrated in FIG. 5, which shows a thermography of a container 1 carried out after the stoppering, as recorded in the monitoring unit 39 under the conditions disclosed above for the thermography illustrated in FIG. 4.

It is noted, according to the thermography of FIG. 5, that the corresponding container 1 has two temperature zones: an outside zone whose temperature is between $T_2$ and $T_3$ (or between 40° C. and 45° C. in the example above) and a central zone whose temperature is between $T_3$ and $T_4$ (or between 45° C. and 50° C. in the example above). Assuming that the value 40° C. is assigned to Ts, it is seen that the temperature of the container 1 whose thermography is illustrated in FIG. 5 is higher than Ts.

Consequently, it should not be attempted to put back the membrane 15 of this container 1, at least not before the temperature of the former has dropped below Ts (or has at the very least reached Ts). Otherwise, even it is supposed that it could be put back, the membrane 15 could not hold the retracted configuration and would itself be put back toward its extended position under the action of the pressure prevailing in the container 1, which would exceed the mechanical strength opposed by the membrane 15.

This is why, in this second case, the monitoring unit 39 controls the at least temporary holding of the pusher 22 in its retracted position. A warning signal can be generated, for example for warning an operator that a container 1 is not in accordance with the temperature, in such a way as to incite it, for example, to verify the temperature of the contents 3 during the filling operation.

According to a first embodiment, the pusher 22 is held in its retracted position during a set time delay, before being moved, on command from the monitoring unit 39 (via the distributor 36), toward its deployed position for putting the membrane 15 back.

For this purpose, the monitoring unit 39 can integrate a predictive model for changing the temperature of the container based on time, which makes it possible for it to calculate the above-cited time delay. This time delay is equal to, for example, the interval of time separating, in the predictive model, the moments at which the container respectively exhibits the measured temperature and the temperature Ts.

The monitoring unit 39 can be programmed for controlling the shifting of the container 1 toward a buffer zone if the measured temperature is greater than the threshold value Ts and if the calculated time delay is greater than a preset time threshold, corresponding to, for example, the time that the filled container 1 is parked on the support 19. In the buffer zone, the container 1 can be left to cool for a preset duration. Once the temperature of the container 1 is less than or equal to the threshold value Ts (which can be measured or calculated by extrapolation from the initial temperature of the container 1), the container 1 is redirected toward the production line for making it possible to put its membrane 15 back. The container 1 can also, if the measured temperature exceeds the threshold value Ts, be subjected to a forced cooling operation, for example by projecting (typically by spraying) a cold liquid onto the body 5. This operation can be accomplished along the production line, or on a separate line toward which the container is shifted as soon as its temperature is higher than the threshold value Ts.

Once the cooling (natural or forced) of the container 1 is finished, the former can be subjected to the operation of putting its membrane 15 back.

It was determined that the membrane 15 can be put back with maximum chances for locking in a retracted position when the measured temperature of the container 1 is equal or essentially equal to a so-called preset target temperature, hereinafter denoted Tc, identical for all of the containers of the same model filled under the same conditions. The target temperature, lower than the threshold temperature Ts, is typically approximately 30° C.

According to a particular embodiment, besides the comparison to the threshold temperature Ts, the measured temperature is in addition compared to the target temperature Tc, recorded in the monitoring unit 39. If the measured temperature is equal (or approximately equal, within several degrees, typically at ±2° C.) to the target temperature Tc, the operating conditions for putting the membrane 15 back are unchanged.

We saw that putting the membrane 15 back can be done even though the measured temperature is less than or equal to the threshold temperature Ts.

By contrast, the comparison with the target temperature Tc determines the operating conditions of the turnaround, with the monitoring unit 39 acting on the force applied to the membrane 15 by the pusher 22 and/or on the speed of motion of the former.

Thus, if the measured temperature is between the threshold value Ts and the target value Tc, the monitoring unit 39 is programmed for increasing the force applied by the pusher 22 to the membrane 15 and/or for increasing the speed of motion of the pusher 22. Actually, this temperature condition means that the pressure in the container remains important and that maintaining the conditions of effort and/or speed applied by the pusher 22 to the membrane 15, which conditions are set for the target temperature Tc, could be insufficient to cause the putting back and/or the locking of the membrane 15 in the retracted position.

In this first case, the monitoring unit 39 can in addition be programmed to promote a decrease in the temperature of the container 1 to make it tend toward the target temperature. For this purpose, and assuming that the packaging 2 is the object of a systematic forced cooling after its filling and its stoppering (and before its membrane 15 is put back), the monitoring unit 39 can control an increase in the regulation temperature applied to the packaging 2 that is thus cooled, until the measured temperature is equal or essentially equal to the target value Tc, which makes it possible to reach optimal productivity.

In contrast, if the measured temperature is lower than the target value Tc, the monitoring unit 39 is programmed to reduce the force that is applied by the pusher 22 to the membrane 15 and/or to reduce the speed of motion of the pusher 22. Actually, this temperature condition means that the pressure existing in the container 1 has dropped, and that it is neither necessary to apply to the membrane 15 a force that is too high nor to move it too quickly, with a view to put it back, and that to the benefit of energy savings. Besides, the limitation of the effort applied to the membrane prevents it from withstanding important (and useless) mechanical stresses.

In this second case, the monitoring unit 39 can be programmed to promote a decrease in the temperature of the container 1 to make it tend toward the target temperature. For this purpose, and assuming that the packaging 2 is the object of a systematic forced cooling after the filling and the stoppering thereof (and before their membrane 15 is put back), the monitoring unit 39 can control a change in the regulation temperature applied to the packaging 2 that is thus cooled, until the measured temperature is equal or essentially equal to the target value Tc, which makes it possible to reach optimal productivity.

It will be noted that since the measured temperature is not necessarily homogeneous over the entire body 5 of the container 1 (as is evident from the illustrated examples in FIGS. 4 and 5), the monitoring unit 39 can, for making its comparisons and its calculations, retain only the upper boundary of the measured temperatures or else can average the former, optionally weighted by the areas of the corresponding surfaces detected on the body 5 of the container 1.

Likewise, it is possible to estimate that an instantaneous thermography (in the form of a single temperature measurement) is adequate, by assuming that the distribution of the temperatures is symmetrical in revolution around the axis X. This hypothesis can in particular be retained if the container 1 is itself symmetrical in revolution around the axis X.

However, it is possible, conversely, to estimate that a complete thermography (in the form of multiple temperature measurements made simultaneously or successively around the container 1) of the container 1 is necessary, by admitting that the distribution of the temperatures is not symmetrical in revolution around the axis X. This hypothesis can in particular be adopted if the container 1 itself has an asymmetry of revolution around the axis X (for example, if the container 1 has a rectangular, square, or oval contour in the cross-section). In this case, the thermography can be carried out by means of multiple sensors (in particular cameras) distributed around the container 1, or by means of a single sensor (in particular a camera) that takes multiple successive temperature measurements (multiple pictures in the case of a camera) per revolution (of the container 1 or of the sensor 40) around the axis X.

In this case, the comparison operations can be repeated for all of the measurements, or an average can be taken for obtaining a mean thermal profile.

It will be noted that henceforth, the measured temperature is that of the body 5 of the container 1, while the turnaround operation relates to the bottom 6 (and more specifically the membrane 15). It is actually possible to consider that the temperature of the bottom 6 (and in particular of the membrane 15) is not essentially different from that of the body 5 because of the relative isotropy of the contents 3, and that the former transfers to the bottom 6 the same quantity of heat (per unit of surface) as to the body 5.

However, it is possible to assume that the body 5 and the bottom 6 do not have the same temperature and/or they do not have the same thermal behavior. In this case, the camera 40 can be mounted facing the bottom 6 for carrying out a direct thermography instead of being mounted facing the body 5. The two positioning options can also be combined.

The method that was just described offers the following advantages.

First, the fact of measuring the temperature of the container 1 (on the body 5 and/or on the bottom 6) before controlling the movement of the pusher 22 (and therefore putting the membrane 15 back) makes it possible to verify whether the membrane can be put back in a reliable manner (i.e., without a risk that the membrane 15 regains its initial position under the pressure prevailing in the container 1).

Second, the fact of putting the membrane 15 back under optimal thermal conditions makes it possible to better control this operation, in particular by reducing the risks of deformation by the pusher 22 (if the temperature of the container 1 is too high).

In the preceding description, the turnaround operation relates to the bottom 6 (and more specifically the membrane 15). However, it could be a matter of turning around any zone on the container 1 (in particular on the body 5), with this zone being deformable between an extended position in which the zone projects toward the outside of the container 1, and a retracted position in which the zone projects toward the inside of the container 1. This deformable zone could be, for example, a bulge that is formed on the body 5 of the container 1 that, in addition to putting the container 1 under pressure by its being put back, could form, for example, a handle facilitating the gripping of the container 1.

The invention claimed is:

1. A method for forming a packaging from a container having a body, a neck and a bottom, the container having a deformable zone, using a mechanical pusher that can move between a retracted position and a deployed position, with an extended configuration in which said deformable zone projects toward the outside of the container, and with a retracted configuration in which said deformable zone projects toward the inside of the container, the method comprising the following operations:

with the deformable zone being in the extended configuration, filling the container with a product that is at a temperature that exceeds the glass transition temperature of the material of the container;

closing in an airtight manner the thus-filled container by mounting a cap on the neck to form a stoppered container;

measuring the temperature of the stoppered container;

comparing the thus-measured temperature to a preset threshold value, when the measured temperature is less than or equal to the threshold value, moving the pusher, from the retracted position, toward the deployed position for switching the deformable zone from the extended configuration to the retracted configuration, when the measured temperature exceeds the threshold value, keeping the pusher at least temporarily in the retracted position; and comparing the measured temperature to a target value that is lower than the threshold value, when the measured temperature is between the threshold value and the target value, increasing the force applied by the pusher to the deformable zone and/or increasing the speed of motion of the pusher.

2. The method according to claim 1, wherein the target temperature is approximately 30° C.

3. The method according to claim 1, further comprising, when the measured temperature exceeds the threshold value, an operation that includes generating a warning signal.

4. The method according to claim 3, further comprising, when the measured temperature exceeds the threshold value, an operation that includes keeping the pusher in the retracted position during a preset time delay, and then an operation that includes moving the pusher toward the deployed position.

5. The method according to claim 1, further comprising, when the measured temperature exceeds the threshold value, an operation that includes keeping the pusher in the retracted position during a preset time delay, and then an operation that includes moving the pusher toward the deployed position.

6. The method according to claim 1, further comprising, when the measured temperature exceeds the threshold value, an operation for forced cooling of the container.

7. The method according to claim 1, further comprising, when the measured temperature exceeds the threshold value, an operation for shifting the container toward a buffer stock.

8. The method according to claim 1, wherein the threshold value is approximately 40° C.

9. The method according to claim 1,
wherein the bottom comprises a membrane, a seat, and a central pin, and
wherein the deformable zone is a membrane that connects the seat and the central pin.

10. The method according to claim 1, wherein the temperature is measured by means of a sensor that includes a thermal camera or a pyrometer.

11. The method according to claim 10, wherein the temperature is measured on the body of the container.

12. A method for forming a packaging from a container having a body, a neck and a bottom, the container having a deformable zone, using a mechanical pusher that can move between a retracted position and a deployed position, with an extended configuration in which said deformable zone projects toward the outside of the container, and with a retracted configuration in which said deformable zone projects toward the inside of the container, the method comprising the following operations:
with the deformable zone being in the extended configuration, filling the container with a product that is at a temperature that exceeds the glass transition temperature of the material of the container;
closing in an airtight manner the thus-filled container by mounting a cap on the neck to form a stoppered container;
measuring the temperature of the stoppered container;
comparing the thus-measured temperature to a preset threshold value,
when the measured temperature is less than or equal to the threshold value, moving the pusher, from the retracted position, toward the deployed position for switching the deformable zone from the extended configuration to the retracted configuration,
when the measured temperature exceeds the threshold value, keeping the pusher at least temporarily in the retracted position; and
comparing the measured temperature to a target value that is lower than the threshold value,
when the measured temperature is lower than the target value, reducing the force applied by the pusher in the deformable zone and/or reducing the speed of motion of the pusher.

13. The method according to claim 12, wherein the target temperature is approximately 30° C.

14. The method according to claim 12, further comprising, when the measured temperature exceeds the threshold value, an operation that includes generating a warning signal.

15. The method according to claim 14, further comprising, when the measured temperature exceeds the threshold value, an operation that includes keeping the pusher in the retracted position during a preset time delay, and then an operation that includes moving the pusher toward the deployed position.

16. The method according to claim 12, further comprising, when the measured temperature exceeds the threshold value, an operation that includes keeping the pusher in the retracted position during a preset time delay, and then an operation that includes moving the pusher toward the deployed position.

17. The method according to claim 12, further comprising, when the measured temperature exceeds the threshold value, an operation for forced cooling of the container.

18. The method according to claim 12, further comprising, when the measured temperature exceeds the threshold value, an operation for shifting the container toward a buffer stock.

19. The method according to claim 12, wherein the threshold value is approximately 40° C.

20. The method according to claim 12,
wherein the bottom comprises a membrane, a seat, and a central pin, and
wherein the deformable zone is a membrane that connects the seat and the central pin.

* * * * *